May 28, 1968
J. MERCIER
3,385,896
PRODUCTION OF MESITYL OXIDE
Filed Jan. 3, 1964
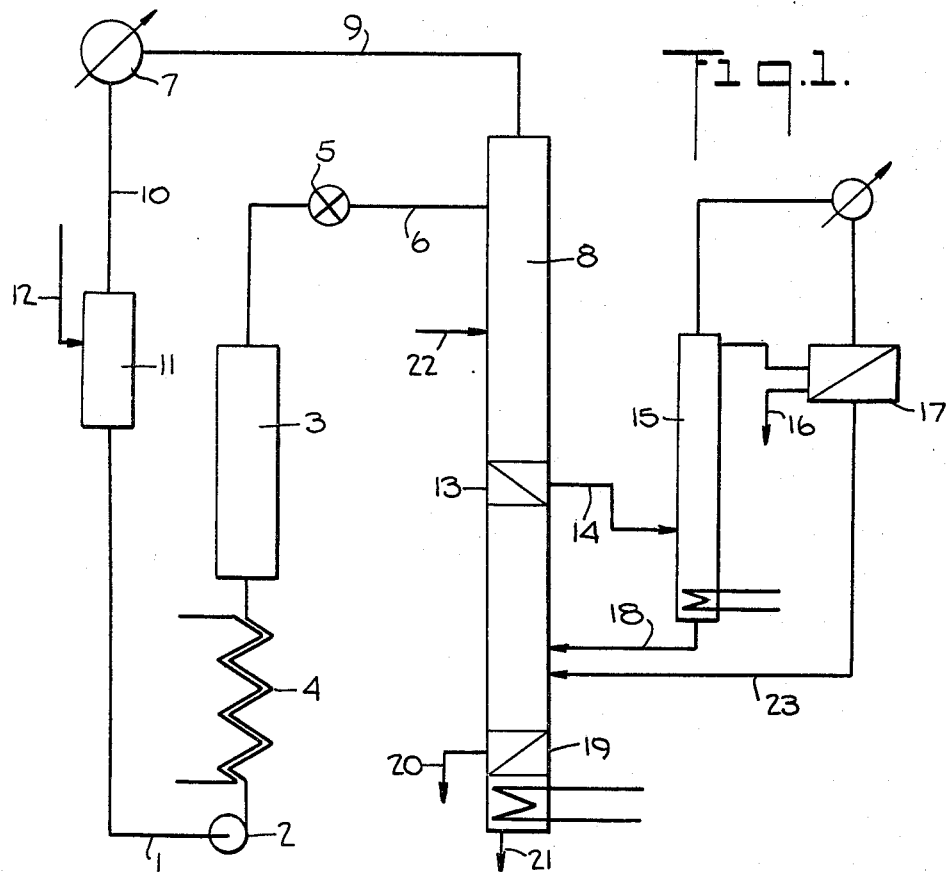
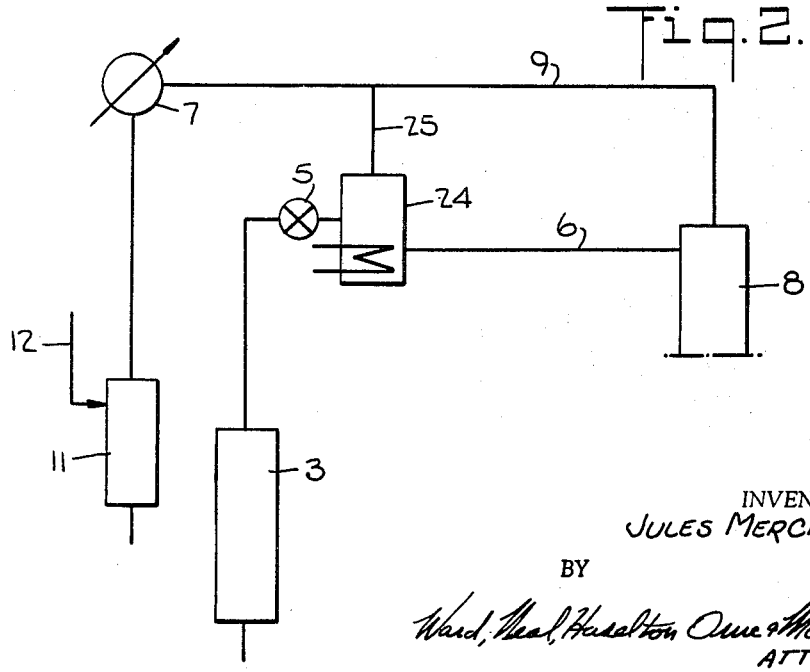
INVENTOR.
JULES MERCIER
BY
Ward, Neal, Haselton, Orne & McElhannon
ATTORNEYS 3,385,896
PRODUCTION OF MESITYL OXIDE
Jules Mercier, Melle, Deux-Sevres, France, assignor to Les Usines de Melle (Societe Anonyme), Melle, Deux-Sevres, France, a corporation of France
Filed Jan. 3, 1964, Ser. No. 335,627
Claims priority, application France, Oct. 16, 1963, 950,740
2 Claims. (Cl. 260—593)

ABSTRACT OF THE DISCLOSURE

This disclosure describes a continuous process for the production of mesityl oxide by contacting a liquid acetone-water mixture containing 1–3% water with a sulfonic type ion exchange resin in the acid form at a temperature of from 100° C. to 160° C. at a sufficiently elevated pressure (5–20 kg./cm.$^2$) to maintain the reaction mixture in the liquid phase.

---

This invention relates to the production of mesityl oxide from acetone by contact with an ion exchange resin in its acid form.

The principal object of the invention is to provide a simple, efficient process for the production of the aforesaid compound.

Mesityl oxide is generally produced by dehydrating diacetone alcohol. It may also be produced continuously by the direct conversion of acetone in one reaction step in accordance with the procedure disclosed in U.S. Patent No. 2,980,731 which describes the conversion by contacting acetone with a sulfonic ion exchange resin in the acid form at a temperature usually in the range of 60° C. to 90° C.

The reaction is as follows:

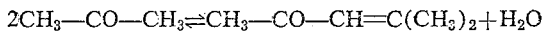

$$2CH_3-CO-CH_3 \rightleftharpoons CH_3-CO-CH=C(CH_3)_2 + H_2O$$

Since water is a product of the reaction, one would expect that the conversion of acetone to mesityl oxide would be favored by utilization of anhydrous acetone containing for example less than 0.3% by weight of water. However, it has been observed that when substantially anhydrous acetone is used, the ion exchange resin becomes gradually contaminated with adsorbed high boiling by-products which progressively deactivate the catalyst resulting in a decrease in the conversion rate of acetone to mesityl oxide. The ion exchange resin catalyst may be reactivated by washing with boiling water to desorb the high boiling by-products and restore the initial activated resin. The reactivation process is a simple operation, but it requires frequent interruptions of a continuous process. Accordingly, it would be highly desirable to avoid it.

This invention accordingly comprises the novel processes and steps of processes, specific embodiments of which are described hereinafter by way of example and in accordance with which I now prefer to practice the invention.

It has now been found in accordance with this invention that the rate at which the resin catalyst becomes contaminated is substantially decreased if the acetone which is to be converted to mesityl oxide contains sufficient water to provide a water-acetone mixture containing less than about 3% by weight of water. Preferably, the mixture will contain from about 1% to about 3% and most desirably about 2% by weight of water.

If the reaction mixture contains a higher proportion of water, the proportion of water-insoluble by-products which contaminate the catalyst is very low. However, the reaction rate decreases very rapidly as the proportion of water in the reaction mixture increases. At a temperature of 100° C., substantially no mesityl oxide is formed if the water concentration in the water-acetone mixture is about 10% by weight. It has been found that for maintaining a practical reaction rate while diminishing the proportion of water insoluble by-products formed, the proportion of water in the water-acetone mixture is preferably between about 1% and about 3% by weight.

The reaction is carried out at an elevated temperature, preferably in the range of from about 100° C. to about 160° C. and the reactants are maintained in the liquid phase by operating at a suitable pressure preferably in the range of from about 5 to 20 kg./cm.$^2$ above atmospheric pressure.

The presence of water in accordance with the process of this invention materially lengthens the active life of the resin catalyst. The initial activity of the catalyst remains substantially constant for more than 1,000 hours working time and thereafter decreases only slowly. For example, after 2,000 hours, the decrease in activity is only of the order of 10%. In the absence of water a decrease of the same order appears soon after 200 hours working time.

In addition to the aforesaid advantage with respect to effective life of the catalyst, the presence of water in the starting acetone in accordance with this invention leads to higher yields. This advantage more than compensates for the slightly decreased reaction rate. The increased yield may be effected by treatment of the high boiling by-products produced in the reaction with an alkaline reagent, for example concentrated aqueous sodium hydroxide solution at a temperature of from about 120° C. to about 160° C. and a pressure of from about 2 to 10 kg./cm.$^2$ above atmospheric to regenerate acetone which can be returned to the reaction mixture. In the absence of water in the starting acetone, the high boiling by-products formed, which have a higher molecular weight, cannot be converted back to acetone.

Moreover, there are additional advantages to this invention since the operations and apparatus for distilling the reaction products may be simplified and the heat consumption materially lowered. These advantages are due to the fact that in contrast with the conventional process starting with substantially anhydrous acetone, it is not necessary in the present process to completely dehydrate the excess acetone recovered from the reaction mixture before it can be again utilized. Accordingly, heat is saved and the separation of the reaction products from one another can be carried out in a single column which acts as an acetone separating column. As this column can be operated without liquid reflux to the top thereof, the heat required is always the lowest possible. The water-containing, recycled acetone may contain a small amount of mesityl oxide but this does not interfere with the course of the reaction.

This invention will be more fully understood by reference to the accompanying drawings forming part of this application and schematically illustrating the apparatus for carrying out the process of the invention.

In the drawings, FIG. 1 schematically illustrates an apparatus suitable for carrying out the process of the invention and FIG. 2 schematically illustrates a modification of the apparatus of FIG. 1.

Referring now to FIG. 1, the acetone is fed to reactor 3 by pipe 1 and pump 2 after being heated to the desired temperature in heat exchanger 4. Reactor 3 is preferably of the cone or frustum shaped type described in the above mentioned U.S. Patent No. 2,980,731.

At the exit from the reactor the reaction products are released in valve 5 and sent by pipe 6 to the head part of separation column 8.

The excess acetone distills off from column 8 by pipe 9, is recovered in liquid condition by pipe 10 after condensation in condenser 7 and is sent back to feed vat 11 which also receives by pipe 12 an amount of acetone equal to the amount converted by the reaction. The raw acetone recovered by pipe 10 has the following average composition:

| | Percent by weight |
|---|---|
| Acetone | 97 |
| Water | 2 |
| Mesityl oxide | 1 |

About the middle part of column 8 the mesityl oxide is separated as an upper layer in decanter 13 and is sent by pipe 14 to rectifying column 15 from the head of which it is withdrawn, free from any trace of high boiling by-products, by pipe 16 after having been separated in decanter 17 from the major part of the water which it contained. The water is sent back to the lower part of column 8 by pipe 23.

At the foot of column 15 there is collected a liquid rich in high boiling by-products which is sent back by pipe 18 on to a plate of column 8 situated between decanter 13 and the foot of column 8. From this part of column 8 the high boiling by-products are separated from the mesityl oxide and recovered by decantation in decanter 19 arranged on the lower plate of column 8, then they are withdrawn by pipe 20. The reaction water is withdrawn by pipe 21.

By pipe 22 an aqueous inorganic base suitably sodium hydroxide solution is fed onto a plate of column 8 situated above decanter 13, to decompose the small amounts of by-product diacetone alcohol.

The apparatus of FIG. 1 may, if desired, be modified as indicated in FIG. 2. It is not necessary to vaporize the whole of the acetone in the head part of column 8. One may, alternatively, separate part of the acetone by vaporization in a vaporizer 24 inserted in pipe 6 between reactor 3 and column 8. The vapors issuing from vaporizer 24 by pipe 25 have substantially the same composition as the vapors issuing from the top of column 8 and may be condensed in condenser 7 together with the last named vapors. The products that were not vaporized in vaporizer 24 are sent to the head part of column 8 by pipe 6. The amount of acetone that can be so vaporized in vaporizer 24 may correspond to 50–70% by weight of the acetone which was not converted by the reaction.

The advantage of this arrangement is that it permits considerably reducing the cross-section of column 8. In addition, because of the low boiling range (60°–65° C.) of the mixture leaving the reactor, it allows low heat which may be available in and recoverable from a neighboring manufacture unit, to be used if desired in vaporizer 24.

The following examples illustrate the manner in which I now prefer to practice my invention. It is to be understood that this invention is not to be considered as restricted thereto except as indicated in the appended claims.

EXAMPLE 1

Reactor 3 (FIG. 1) contained 400 liters of sulfonic polystyrene resin catalyst "Allassion CS," product of Company A.C.F.I. (Auxiliaire des Chemins de Fer et de l'Industrie), in its acid form, having already worked in the process for 2,000 hours.

Reactor 3 was fed by pipe 1 with 1030 kg. per hour of the liquid contained in vat 11, which liquid comprised:

| | Kg. |
|---|---|
| Acetone | 1000 |
| Water | 20 |
| Mesityl oxide | 10 |

Before entering reactor 3, this liquid was brought to 110° C. in heat exchanger 4. The reactor was maintained at a pressure of 6 kg./cm.$^2$ above atmospheric.

At the exit of the reactor there was obtained, per hour, 1030 kg. of reaction mixture having the following composition:

| | Kg. |
|---|---|
| Acetone | 910.5 |
| Water | 34 |
| Mesityl oxide | 76 |
| Diacetone alcohol | 3 |
| High boiling by-products | 6.5 |

The reaction mixture was fed by pipe 6 to the head part of column 8, which column was also fed, by pipe 22, with 4 liters per hour of dilute sodium hydroxide aqueous solution containing 4 grams per liter of sodium hydroxide to convert the diacetone alcohol back to acetone.

There was withdrawn from the top of column 8 and sent back to vat 11 by pipe 10, per hour:

| | Kg. |
|---|---|
| Acetone | 913.5 |
| Water | 20 |
| Mesityl oxide | 10 |

Vat 11 was fed by pipe 12 with 86.5 kg. per hour of fresh acetone.

By pipe 16 there was obtained 68.7 kg. per hour of water-containing mesityl oxide having the following composition:

| | Kg. |
|---|---|
| Mesityl oxide | 66 |
| Water | 2.7 |

The high boiling by-products, which contained a little water dissolved, were withdrawn by pipe 20 and heated to 140° C. at a pressure of 3 kg./cm.$^2$ above atmospheric pressure in the presence of concentrated sodium hydroxide as aforesaid. This allowed recovery of about 2 kg. of acetone.

The residual water was withdrawn by pipe 21.

EXAMPLE 2

Reactor 3 (FIG. 1) contained 100 liters of a sulfonic polystyrene resin catalyst in its acid form, having already worked in the process for 1,000 hours.

Reactor 3 was fed by pipe 1 with 3630 kg. per hour of the liquid contained in vat 11, which liquid comprised:

| | Kg. |
|---|---|
| Acetone | 3550 |
| Water | 60 |
| Mesityl oxide | 20 |

Before entering reactor 3, this liquid was brought to 140° C. in heat exchanger 4. The reactor was maintained at a pressure of 13 kg./cm.$^2$ above atmospheric.

At the exit of the reactor there was obtained, per hour, 3630 kg. of reaction mixture having the following composition:

| | Kg. |
|---|---|
| Acetone | 3388 |
| Water | 85.5 |
| Mesityl oxide | 140 |
| Diacetone alcohol | 4 |
| High boiling by-products | 12.5 |

The reaction mixture was fed by pipe 6 to the head part of column 8, which column was also fed, by pipe 22, with 5.5 liters per hour of sodium hydroxide aqueous solution containing 40 grams per liter of sodium hydroxide to convert the diacetone alcohol back to acetone.

There was withdrawn from the top of column 8 and sent back to vat 11 by pipe 10, per hour:

| | Kg. |
|---|---|
| Acetone | 3392 |
| Water | 60 |
| Mesityl oxide | 20 |

Vat 11 was fed by pipe 12 with 158 kg. per hour of fresh acetone.

By pipe 16 there was obtained 124.9 kg. per hour of water-containing mesityl oxide having the following composition:

| | Kg. |
|---|---|
| Mesityl oxide | 120 |
| Water | 4.9 |

The high boiling by-products, containing a little water dissolved, were withdrawn by pipe 20 and heated to 130° C., at a pressure of 7 kg./cm.² above atmospheric pressure in the presence of concentrated sodium hydroxide. This allowed recovery of 1.5 kg. of acetone.

The residual water was withdrawn by pipe 21.

Of course, the above described apparatus form has no limiting character. Thus, additional arrangements may be provided to recover heat. For example, column 8 and vaporizer 24 may be operated under different pressures, so that the vapors issuing from column 8 can be used to heat the vaporizer. It is also possible to arrange decanter 13 and 19 outside column 8, in accordance with conventional techniques.

What is claimed is:

1. A continuous process for the production of mesityl oxide which comprises contacting a liquid water-acetone mixture containing from about 1% to about 3% by weight of water with a sulfonic-type ion exchange resin in its acid form at a temperature of from about 100° C. to about 160° C. and a pressure of from about 5 to about 20 kg./cm.² above atmospheric pressure.

2. In a continuous process for the production of mesityl oxide by contacting acetone with a sulfonic-type ion exchange resin in its acid form at a temperature of from about 100° C. to about 160° C. and a pressure or from about 5 to about 20 kg./cm.² above atmospheric pressure, the improvement which comprises admixing sufficient water with the acetone to provide a water-acetone mixture containing from about 1% to about 3% water by weight.

References Cited

UNITED STATES PATENTS 2,351,352    6/1944    McAllister et al. _____ 260—593

OTHER REFERENCES

Klein et al. Ind. Eng. Chem. 48, 1278–1286 (1956) Call No. TP1. A58.

DANIEL D. HORWITZ, *Primary Examiner.*